(Model.)
2 Sheets—Sheet 1.
A. W. PAGETT.
SEED PLANTER.
No. 254,153. Patented Feb. 28, 1882.
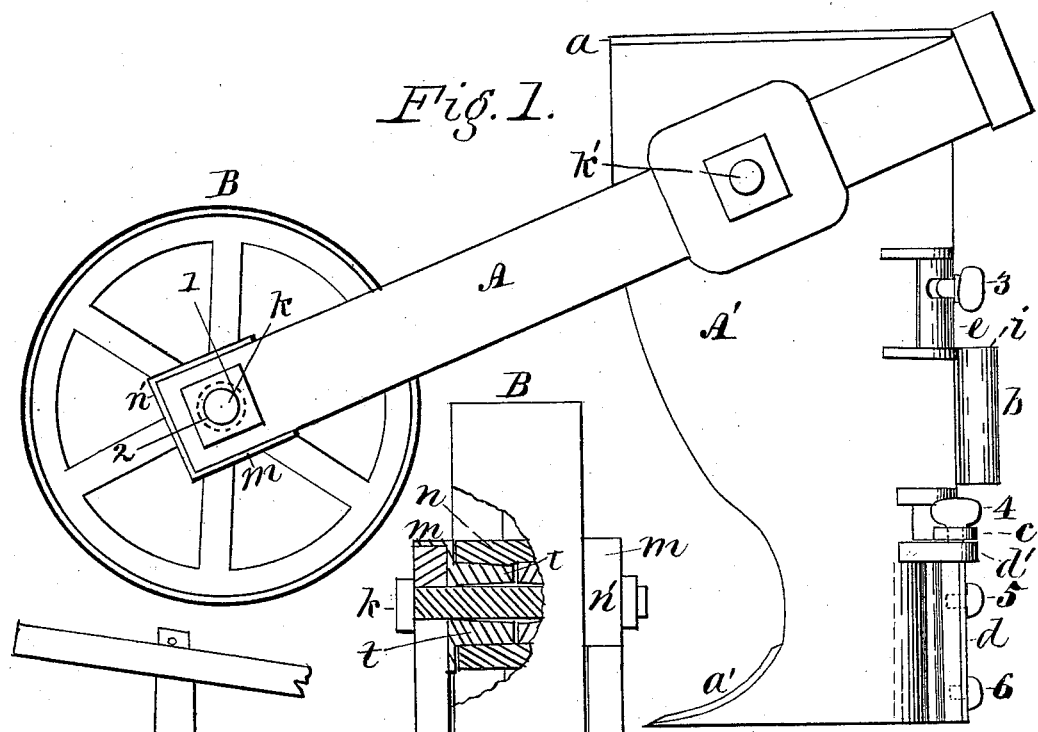
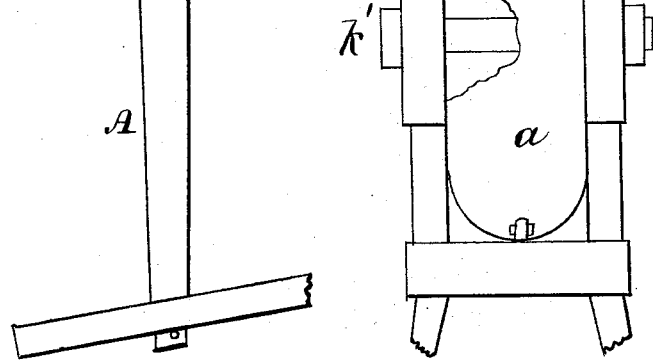
Attest.
G. W. Driscol
P. H. Penfield
Inventor.
Alexander W. Pagett.
B. C. Converse, atty.
N. PETERS, Photo-Lithographer, Washington, D. C.

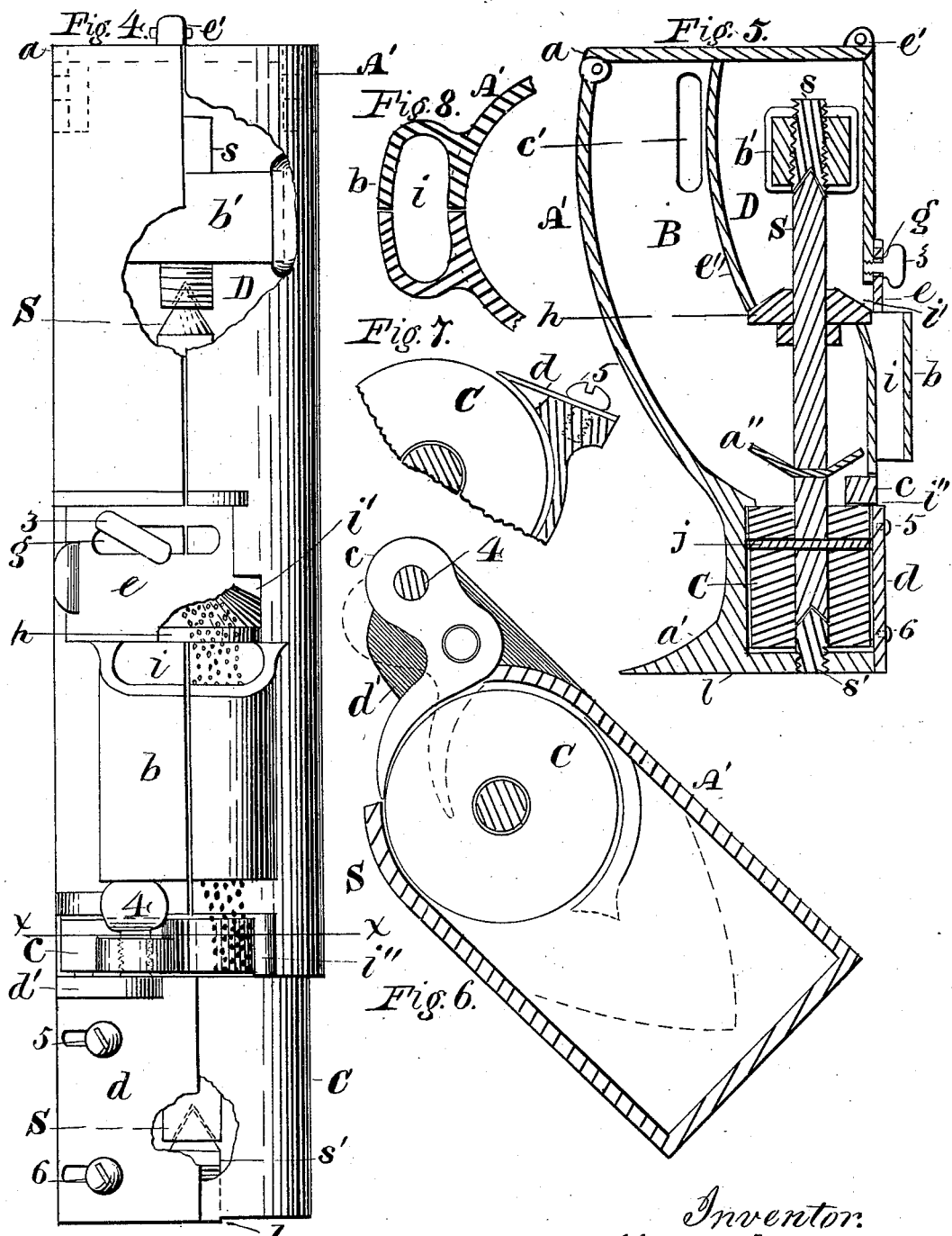

UNITED STATES PATENT OFFICE.

ALEXANDER W. PAGETT, OF CLARKE COUNTY, OHIO.

SEED-PLANTER.

SPECIFICATION forming part of Letters Patent No. 254,153, dated February 28, 1882.

Application filed July 5, 1881. (Model.)

*To all whom it may concern:*

Be it known that I, ALEXANDER W. PAGETT, a citizen of the United States, residing in the county of Clarke, and in the State of Ohio, have invented a new and useful Improvement in Seed-Planters, which improvement is fully, clearly, and exactly described in the following specification.

My invention relates to a seed-planter which is novel in its construction and operation, and which is adapted for planting or sowing seeds of any kind.

My invention relates, further, to a planter which is adapted to sowing two or more kinds of seeds or of fertilizer and seeds at the same time. The mechanism for sowing the seeds and the fertilizer is inclosed in the body of the furrowing-plow, and it is driven by a horizontal ground-wheel within the mold-board (or partially so) of the plow upon a vertical shaft, which carries the several sowing and distributing devices for planting the seed and sowing the fertilizer substances, which may be used in the machine either separately or combined.

Figure 1 is a side elevation of my seed-planter as applied to a garden-plow operated by hand. Fig. 2 is a top view of the same, the handles in each figure being cut off just in rear of the boot or seed-sower A'. Fig. 3 is a section of the handles. Fig. 4 is an enlarged view of the boot A', which contains the mechanism, as well as the seed or fertilizer receptacles, and which forms the major part of my invention. Fig. 5 is a vertical section of the boot A', of reduced size. Fig. 6 is a cross-section through line $x$, Fig. 4, and shows the lower part of the boot A'. Fig. 7 is a sectional view of the ground-wheel and scraper from the top. Fig. 8 is a top view of the discharge-tube and a part of the contiguous shell of the boot A', to which it is connected.

A is a pair of extended handles, forming the frame of a hand-plow, to which the seed-magazine A' and its sowing devices are in this case applied.

I wish to be distinctly understood as not confining my invention to a single hand-seeder, as its ready adaptability to be used in horse-power machines, singly or in gangs, (as common with seed-drills,) is apparent.

The outer contour of the seeding-machine resembles a boot, the upper or leg part extending, as seen in Fig. 1, above the frame A. This part is made large enough to allow of its being divided into two or more compartments for containing the seeds or seed and fertilizer, as it may be. In the view Fig. 5 two compartments, B and D, are seen, the compartment D surrounding the moving mechanism of the seeder, and the compartment B in front of it, the body being divided laterally by the upright partition $e''$, as seen in the above figure.

The lower or foot part of the boot is plow-shaped, with its point or share extending forward for furrowing, as seen in Figs. 1 and 5, and in dotted lines, Fig. 6. An upright shaft, S, extends from top to bottom of the boot A', being supported upon pivots at either end. At the top an adjustable screw, $s$, having a socket in its lower end and passing through a cross-bar, $b'$, supports the mandrel-point of shaft S within the upper part of the boot, and at the lower end the shaft is in turn stepped upon the mandrel-point of the bearing stud or post $s'$, which latter is threaded and screwed into the bottom plate, $l$, of the plow or hoe.

The front part of the boot is square or rectangular and the rear part cylindrical, as shown in the top view, Fig. 2, in the rear view, Fig. 4, and in the cross-section, Fig. 6, the object in forming the rear portion round being to conform internally to the revolving mechanism within it and to allow of the easy adjustment of the gates where the discharge of the seed takes place.

At the lower end of the compartment D is seen a beveled wheel, $h$, in Fig. 5. This wheel sets upon a collar, and is used to facilitate the discharge of seed from this compartment through the discharge-hole $i'$ and the tube $i$ in $b$. (See Fig. 4, which shows the operation of the seed-sowing mechanism.) The seed from both compartments B and D is dropped in the open furrow made by the plow and in rear of the ground-wheel C. This wheel is mounted upon the lower end of the shaft S, and about two-fifths of its periphery is exposed to the action of the earth upon it when the machine is in operation, which, as the hoe or plow is forced through the same, revolves with the distributing and seed-sowing mechanism above it, mounted upon the same shaft.

By reference to Fig. 5 the position of the various parts of the mechanism within the boot or hoe can be clearly seen.

The wheel C is cylindrical, and is nicely fitted within the shell of the hoe. On the rear side, to the left of its median line, is a flat steel scraper, $d$, which is seen in Figs. 1, 4, and 7. It is made adjustable by slots, and is held by the screws 5 and 6. In furrowing wet ground the scraper cleans the wheel C of any accumulations on its surface. The wheel C is secured upon the shaft S by a transverse pin, $j$, extending through both, as seen in Fig. 5.

Above the ground-wheel, and almost touching its top surface, is pivoted a cut-off, $c$, which sweeps with its free end across that part of said top surface in proximity to the discharging-orifice $i''$ from the compartment B. The cut-off gate $c$ is made adjustable by the thumb-screw 4, (see Figs. 1, 4, 5, and 6,) the latter impinging upon the projecting lug $d'$, to which the gate is pivoted, and which is extended beyond its pivoted point for the purpose. The tube $b$ above this, through which the seed is seen falling in Fig. 4, prevents the wind from blowing it away before it reaches the furrow.

The bevel-wheel or distributer $h$ is seen next above, (on the shaft,) the functions of which have been before described. Either compartment may be used for seed; but in using a fertilizer the cut-off gate $c$ is more particularly adapted for that purpose, and it can be easily changed and used upon a wheel or distributer discharging from the upper orifice instead of the lower, or from compartment D instead of B, the nature and object of my invention not being affected by this change.

Within the compartment B, near its lower end, is an agitator, $a''$, consisting of a rod extending transversely through the shaft S, and having its ends bent upward.

The discharge-orifice $i'$ is regulated by a slide, $e$, which is bent to conform to the shape of A′ at this point, being made adjustable by a thumb-screw, 3, passing through its slot $g$, as seen in Figs. 4 and 5. On the top of the boot A′ is a hinged lid, $a$. A slot, $c'$, in the upper part of A′, extending through both sides and seen in Fig. 5, allows the hoe easy adjustment upon the transverse bolt $k'$, (see Figs. 1 and 2,) so as to give the proper depth or angle desired. In the views Figs. 1 and 2, which show the device in a hand-planter, the pilot-wheel B has its hub $n$ bored out large to admit the bearing-blocks $m$ on either side, as seen where the parts are broken out in Fig. 2. Blocks $m$ have in them a hole for the bolt $k$, and extend to the center of the wheel-hub from each side. The strap $n'$, extending around the ends of the handles A or frame-pieces of the plow, is in one piece with the interior bearing, $t$, as seen in this figure, and in the dotted circular line, Fig. 1. This manner of forming the bearing is applicable to a two-wheeled planter, and has the advantage of giving a large bearing as well as steadiness and strength to the wheel. The sub hubs or bearings $t$ of the two pieces $m$ taper slightly toward the center of the main hub $n$, as shown.

I claim as my invention—

1. A hoe for seed drills or planters, having within the shell of the same separate receptacles for holding seeds of different kinds, or seed and a fertilizer, in combination with a separate seed-sowing device for each of said receptacles, all of said seed-sowing devices being upon a single vertical shaft within said hoe, whereby they are operated together, as set forth.

2. A seed-planter in which the distributing or seed-sowing devices are operated by a traction-wheel revolving in a horizontal plane wholly or partially beneath the ground-surface, said wheel or driver deriving its motion from contact with the side of the furrow as the hoe or plow in which said wheel and seed-sowing devices are incased is drawn through the ground.

3. In a hoe or plow for seed-planters, the combination of a horizontal drive-wheel, operated as described, and distributing or seed-sowing devices for sowing different kinds of seeds, or seed and fertilizer, either separately or combined, on a single vertical shaft within said hoe or plow, as hereinbefore specified.

ALEXANDER W. PAGETT.

Attest:
  H. K. WELLS,
  B. C. CONVERSE.